March 17, 1959 C. C. RITTBERGER, JR 2,877,889
BUTCHERING APPARATUS
Filed March 20, 1957 3 Sheets-Sheet 1

INVENTOR
CARL C. RITTBERGER, Jr.

BY *Cushman, Darby & Cushman*
ATTORNEY

March 17, 1959 C. C. RITTBERGER, JR 2,877,889
BUTCHERING APPARATUS

Filed March 20, 1957 3 Sheets-Sheet 2

INVENTOR
CARL C. RITTBERGER, Jr.

BY *Cushman, Darby & Cushman*
ATTORNEY

March 17, 1959

C. C. RITTBERGER, JR 2,877,889

BUTCHERING APPARATUS

Filed March 20, 1957

INVENTOR
CARL C. RITTBERGER, Jr.

BY Cushman, Darby & Cushman
ATTORNEY

United States Patent Office 2,877,889
Patented Mar. 17, 1959

2,877,889

BUTCHERING APPARATUS

Carl C. Rittberger, Jr., Zanesville, Ohio

Application March 20, 1957, Serial No. 647,286

5 Claims. (Cl. 198—196)

The present invention relates to a skinning and/or butchering apparatus and, more particularly, to an apparatus which conveys the carcass of a slaughtered animal at approximately floor level, whereby butchers operating on both sides of the conveying apparatus can partially skin and perform various butchering operations.

Slaughtering, skinning and butchering of animals, such as cattle, hogs, or the like, is governed by strict Federal regulations and inspections with regards to sanitation conditions. The construction of the plants where the various slaughtering, skinning and butchering operations are performed must meet definite sanitation requirements. There must be adequate pure water supply, drainage, plumbing, etc. Further, the floors and walls of the plants, as well as the machinery, must be of such construction that thorough cleaning is possible. The mechanisms used in handling the carcasses must be of such design that they may be readily cleaned and disinfected to eliminate any possibility of contamination of the edible products of the carcasses as they are being butchered.

An object of the present invention is to provide an apparatus for use in a meat packing plant, or the like, which is so designed that its parts have no hidden crevices where bacteria may gather, the parts of the apparatus being readily cleaned while the apparatus is being used.

Heretofore, in the skinning and butchering of animals, after they have been slaughtered and completely bled, the carcasses were suspended on an overhead rail and the hide was skinned from the head and the head unjointed and removed immediately after the esophagus was severed. After the head had been removed, the carcass was lowered to the floor and then propped up by pritch poles so that the skinning operation could be begun. After the hide had been skinned from the carcass, the carcass was again raised from the floor and suspended from an overhead rail and conveyed along as evisceration was carried out. During the evisceration, the viscera was removed from the carcass and placed on the viscera trucks which moved along with the carcass so that the viscera could be inspected simultaneously with the carcass.

Skinning of the carcass as it was propped up by pritch poles had disadvantages, in that there was chance of the carcass becoming exposed to and contaminated with bacteria, and further, in that the carcass did not present itself in a position where a number of men could simultaneously work on the carcass. Suspension of the carcass on an overhead rail conveyor during the evisceration and butchering operation has disadvantages, in that it too eliminated the chance of a number of men simultaneously operating on the carcass.

Another object of the present invention is to provide apparatus wherein the skinning and/or butchering operation can be performed by a number of men operating simultaneously on the carcass.

Ancillary to the preceding object, it is an object of the present invention to provide an apparatus which can continuously receive carcasses and on which the skinning and butchering operations can be continuously performed on the carcasses as they are moving along the conveyor.

Still another object of the present invention is to provide an apparatus which positions the carcass in such a manner that the carcass may be easily cleaned and washed during the skinning and/or butchering operation.

A still further object of the present invention is to provide an apparatus wherein the carcass of a slaughtered animal can be at least partially skinned and butchered, which will decrease the time it takes from the slaughtering of the animal until it is fully dressed. It is important from the standpoint of meat storage to reduce the time between slaughtering and dressing of the carcass so as to reduce the exposure of the carcass to any bacteria in the air.

A still further object of the present invention is to provide apparatus for conveying carcasses as they are being skinned and/or butchered, which is simple to manufacture and easy to maintain.

These and other objects of the present invention will appear more fully in the following specification, claims and drawings, in which:

Figure 1:
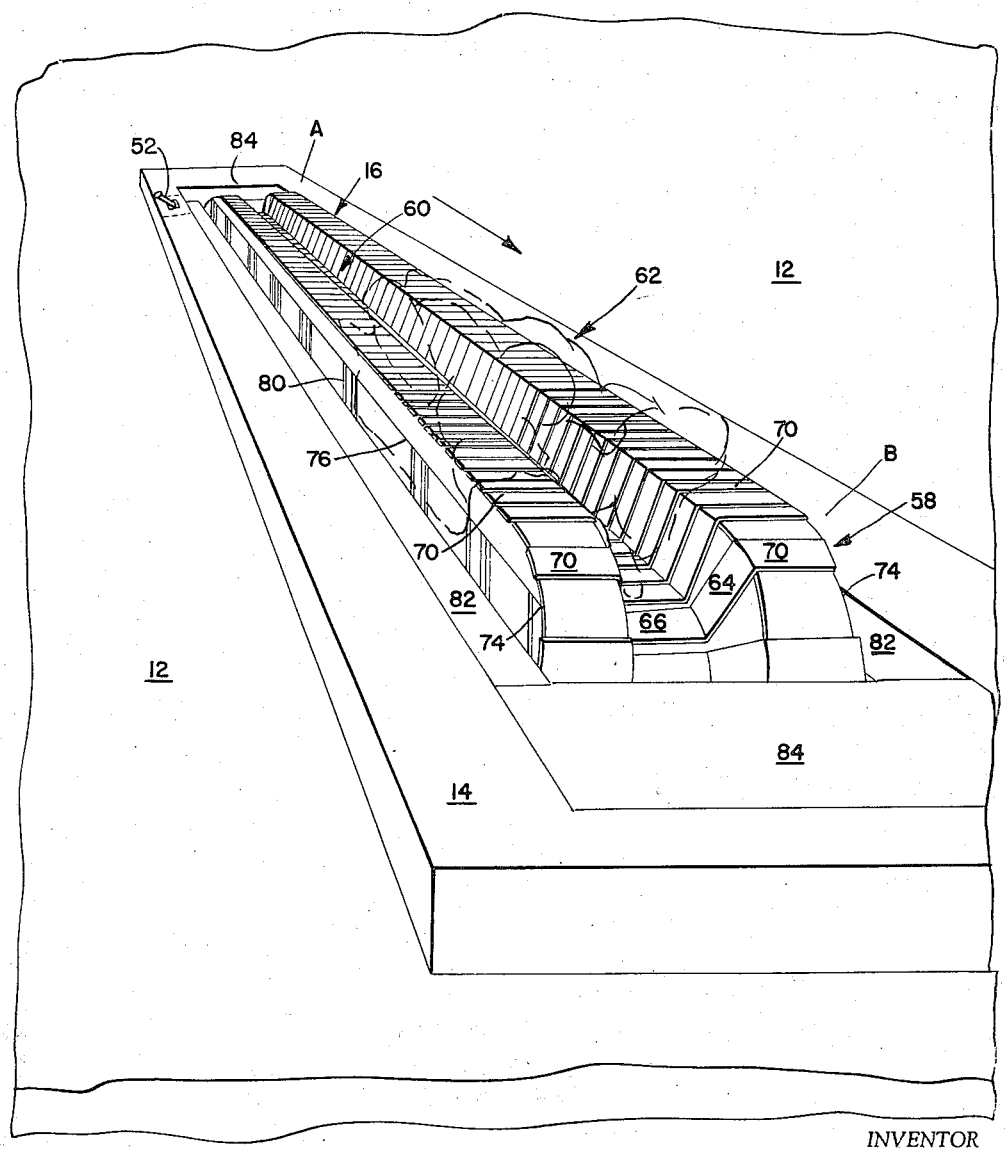
Figure 1 is a perspective view of the apparatus of the present invention installed in the floors of a packinghouse, a carcass being shown on the conveyor or structure, in broken lines.

Referring to the drawings, wherein like character or reference numerals represent like or similar parts, the apparatus of the present invention may be positioned in a well 10 (Figure 5) provided in the floor 12 of a packinghouse, adjacent an overhead conveyor or rail (not shown) which delivers carcasses from the killing floor of the slaughter room just after the slaughtering and bleeding operation. The floor 12 may be provided with a raised step portion 14 which surrounds the well 10 and acts as a work platform for workmen operating on the carcasses from both sides of the well.

The apparatus of the present invention consists generally of an endless conveyor means 16 supported within the well 10 so that it has an upper reach which runs substantially horizontally at an elevation just above the platform or step 14. Carcasses delivered to the conveyor means 16 by an overhead rail conveyor, not shown, are positioned on upper reach of the conveyor means at one end thereof and as the conveyor means moves the carcasses toward the other end thereof, butchers positioned on both sides of the conveyor means simultaneously and continuously perform the skinning and butchering operations. By the time the carcass has been transferred to the discharge end of the endless conveyor means 16, the hide of the carcass will have been skinned from the same, except for the back portion, where the carcass is supported and, further, the carcass will have been eviscerated and butchered, as desired, for the particular type of operation being performed. When the carcass is discharged at the end of the conveyor means 16, it is picked up by an overhead conveyor and the remaining portion of the hide severed therefrom. If the carcass has been halved or quartered these portions of the carcass can then be transferred by an overhead conveyor to the chilling or curing rooms, depending upon the type of animal being butchered. It is also to be understood that if certain edible portions are removed from the carcass while on the conveyor means 16, these portions can also be transferred to the chilling or curing room for packing.

Figure 2:
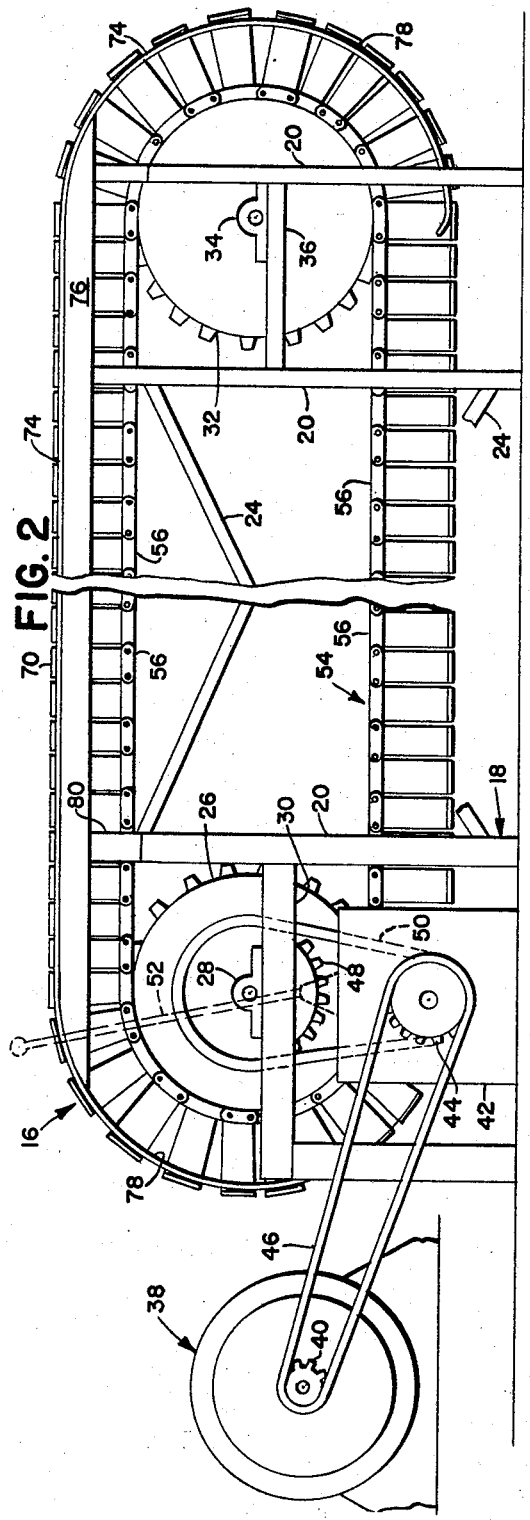
Figure 2 is a side elevational view of the apparatus of the present invention, the well and floor of the packinghouse being omitted.
Figure 3:
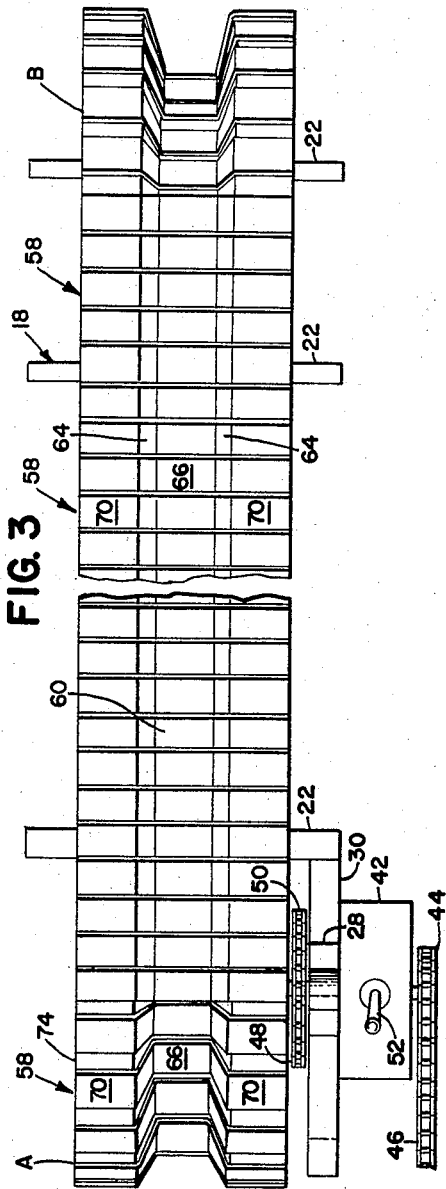
Figure 3 is a top plan view of the apparatus shown in Figure 2.
Figure 5:
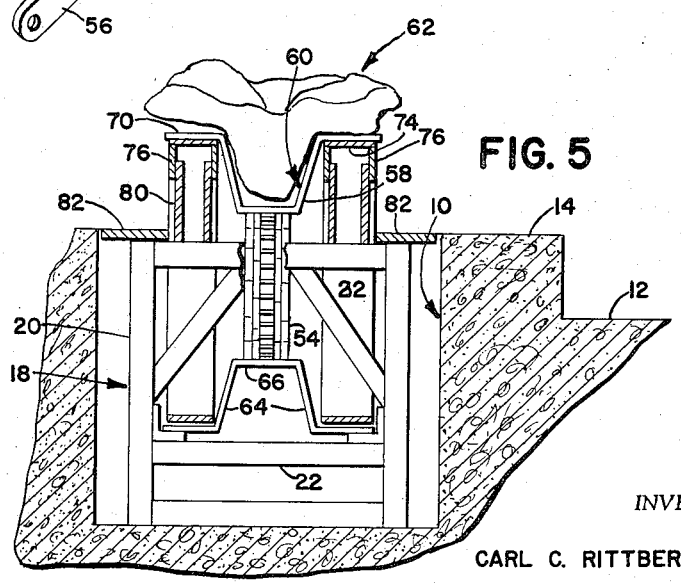
Figure 5 is an end elevational view, partly in section, of the apparatus as positioned in a well on a floor of a packinghouse.

In more detail, and referring now to Figures 2, 3 and 5, the conveyor means 16 is supported by an elongated frame structure 18 positioned within the well 10. The frame structure 18 is provided with vertical standards 20 which have a length substantially equal to the depth of the well and a plurality of upper and lower cross members or braces 22. Any suitable cross braces 24 may be provided between the vertical standards 20 or the horizontal cross members 22 to give added rigidity to the elongated frame structure 18.

A drive sprocket or pulley 26, supported for rotation in pillow blocks 28 carried by a member 30 of frame structure 18, is provided at one end of the conveyor means 16. A second sprocket or pulley 32, rotatably mounted in pillow blocks 34 supported on a member 36 of frame structure 18, is provided at the opposite end of the frame structure. A source of power 38, such as an electric motor, or the like, is provided adjacent the end of the frame structure on which the drive sprocket 26 is mounted. The motor 38 is provided with a gear 40 and a transmission box or unit 42 is provided with a gear 44. An endless chain 46, extending about the gears 40 and 44, drives the transmission unit 42. A gear 48 is mounted on the same shaft which supports drive sprocket 26. A chain drive 50 passing around the gear 48 and a gear (not shown) of the transmission unit 42, drives the sprocket 26. A gear shift 52, shown in dotted lines in Figure 2, extends out of the transmission unit 42 and provides a means for changing the speed of the drive sprocket 26.

The conveyor means 16 includes an endless chain conveyor 54 made up of a plurality of links 56 pivotally connected to each other, which pass around the drive sprocket 26 and the driven sprocket 32. Each of the links 56 has a channel-shaped element 58 rigidly secured thereto. The channel-shaped elements 58, when on the top reach of the conveyor, define a relatively deep longitudinally extending channel 60 and it is in this channel 60 that a carcass 62 is positioned and rigidly supported with its back in the channel and its backbone presented downwardly. A more detailed description of the positioning of the carcass in the longitudinal channel 60, as defined by the channel-shaped elements 58, will follow later in the specification.

Figure 4:
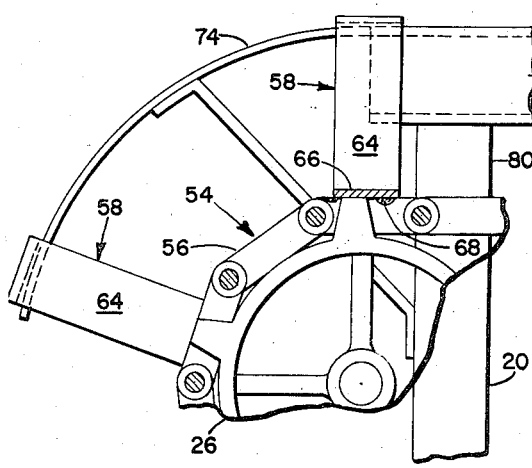
Figure 4 is an enlarged fragmentary view of the driving means for the conveyor structure, parts being shown in section.
Figure 7:
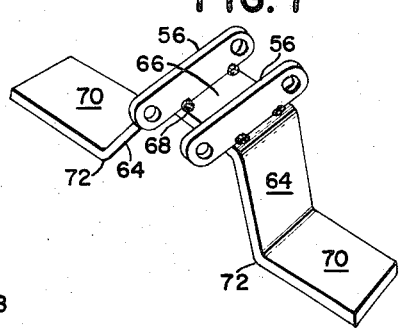
Figure 7 is a perspective view, similar to Figure 6, but showing a carcass supporting element inverted.
Figure 6:
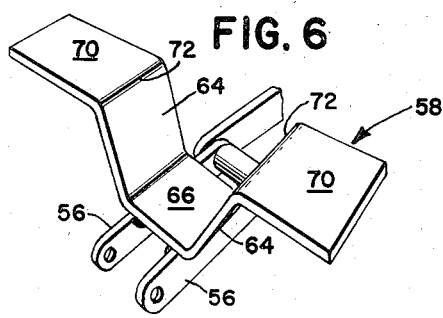
Figure 6 is a perspective view of one of the carcass supporting elements of the conveyor structure.

The channel-shaped elements 58, as best shown in Figures 4, 6 and 7, are provided with converging side walls 64 and a web portion 66 which is rigidly attached to the links 56 of chain 54 by welding, or the like, as indicated at 68. Since the side members 64 of the channel-shaped elements diverge outwardly away from the web portion 66, the channel-shaped elements are effectively centrally attached to the endless conveyor chain 54. Flange portions 70 extend outwardly from the outer ends 72 of each of the channel-shaped elements 58. As clearly shown in Figures 1, 3 and 5, the channel-shaped elements 58, when secured to the conveyor chain 54, extend transversely of the frame structure 18.

A pair of transversely spaced guide rails 74, supported on longitudinal members 76, extend underneath the flange portions 70 of channel-shaped elements 58 along the upper reach of the conveyor means 16. The rails 74 are curved, as indicated at 78, at each end. Suitable vertical braces 80, carried on the upper cross members 22, are used to support the members 76 and rails 74. Suitable floorboards 82, extending longitudinally along each side of the conveyor means 16 at the level of the step 14, may be provided to cover the portion of the conveyor means and frame structure positioned within the well 10. Removable inspection panels 84 are provided at either end of the conveyor means 16 whereby the portion of the conveyor means positioned within the well may be inspected. The source of power 38, as well as the transmission unit 42, may be buried in the well at one end of the conveyor so that they are concealed and out of the way. Suitable controls to start and stop the motor 38 are provided, the gear shift 52, which extends above the level of the step or block 14, being used to control the speed of the conveyor means.

In operation, the carcass 62 of a just slaughtered animal, is placed on the conveyor means 16 at the infeed end, designated as A. The carcass is placed in the moving relatively deep channel 60 defined by the channel-shaped members 58, with its back facing downwardly so that its body and legs will stand up rigidly. When positioned in the channel, the backbone of the carcass is positioned adjacent the web portion 66 of the channel-shaped elements 58 and the sloping side wall 64 tend to wedge the carcass therein so that it is rigidly held upright. The rails 74, positioned under each of the flange portions 70 of the channel-shaped elements 58, give the centrally supported channel-shaped elements lateral support and stability when the carcass is placed thereon. The flange portions 70 also provide a horizontal surface along either side of the upper reach of the conveyor means 16, the surface being effective during the skinning and butchering operation to support the hide as it is cut away from the carcass. By supporting the hide outwardly from the carcass, as it is skinned therefrom, the workmen performing additional butchering operations have a freer access to the carcass. Further, the flange portions support the hide in such a manner that the hide may hang over the sides of the conveyor means 16 without becoming entangled with any of the parts of the conveyor means, because no moving parts extend outwardly of the flange portions 70.

Men operating on either side of the conveyor means 16 first skin the hide from the legs and each side of the carcass, with the exception of the back portion positioned between the side portions 64 of the carcass supporting elements 58. As the carcass moves along with the movement of the conveyor other men can butcher the carcass in any desired manner. After the carcass has been suitably cut, it is discharged at the end indicated B in Figure 1, where it is picked up by an overhead hoist and the back portion of the hide is skinned from the carcass. The carcass can then be transferred to chilling or curing rooms or may be further cut into halves and quarters for delivery to wholesalers or dealers. It will be understood that as the carcass is being conveyed along the conveyor means 16 and the various operations are being performed thereon, the carcass can be constantly cleaned by water, with suitable drainage being provided within the well 10.

The apparatus of the present invention has been disclosed as positioned in a well 10 provided in the floor of the packinghouse, the top run of the conveyor means being positioned slightly above the floor level. It will be understood that the apparatus could be positioned directly on the floor of a packinghouse and suitable scaffolding provided around the apparatus, permitting the men to have easy access to the carcasses.

The terminology used in this specification is for the purpose of description and not limitation, the scope of the invention being defined in the claims.

I claim:

1. In an apparatus for skinning and/or butchering carcasses of slaughtered animals: an elongated frame structure; an endless conveyor means on said frame structure having a substantially horizontal upper reach; means for driving said endless conveyor means; a plurality of substantially rigid channel-shaped elements extending transversely of and connected at their centers to the periphery of said endless conveyor means, said channel-shaped elements including side walls converging toward each other and toward said conveyor means and defining a deep longitudinal channel on the upper reach of said conveyor means, said channel-shaped elements having flange portions extending outwardly from the outer ends of their side walls, said flange portions defining a horizontal surface extending along each side of the longitudinal channel; means carried by said frame structure longitudinally of the same and located on opposite sides of and above said conveyor means, said last-mentioned means cooperating with and supporting the flange portions of said channel-shaped elements when said channel-shaped elements are at least on the upper reach of said conveyor means.

2. An apparatus of the character described in claim 1, wherein said means for driving said conveyor includes a transmission whereby the speed of said conveyor can be regulated.

3. In an apparatus for skinning and/or butchering carcasses of slaughtered animals: an elongated frame structure; an endless conveyor means mounted on said frame structure and having a substantially horizontal upper reach; means for driving said endless conveyor means; a plurality of channel-shaped elements each having a web portion, side walls, and flange portions extending outwardly from the outer ends of said side walls, said channel-shaped elements extending transversely of and connected at their centers to the periphery of said conveyor means, said channel-shaped elements also being arranged in closely spaced relationship to each other and defining a deep longitudinally extending channel on the upper substantially horizontal reach of said endless conveyor means for receiving the back portion of and rigidly supporting the carcass in an upright position with its backbone presented downwardly in the longitudinal channel between the sides of said elements, said flange portions of said channel-shaped elements defining horizontal surfaces extending along each side of the longitudinal channel for supporting the hide of the carcass after being partially cut away from the carcass; and a pair of spaced guide rails carried by said frame structure longitudinally of the same and located on opposite sides of and above said conveyor means, said guide rails cooperating with and supporting the flange portions of said channel-shaped elements when said channel-shaped elements are at least on the upper reach of said conveyor means.

4. An apparatus of the character described in claim 3, wherein each of said guide rails include curved portions at each end thereof and engage the flange portion of said elements as they approach and leave the upper horizontal reach of said conveyor means.

5. An apparatus of the character described in claim 3, wherein said side walls converge toward said conveyor means so that the carcass is substantially wedged between the side walls when positioned in the longitudinal channel.

References Cited in the file of this patent

UNITED STATES PATENTS

| 781,138 | Etcheverry | Jan. 31, 1905 |
| 1,316,626 | Lundell | Sept. 23, 1919 |

FOREIGN PATENTS

| 38,514 | Denmark | Feb. 24, 1928 |
| 88,705 | Norway | Feb. 4, 1957 |